United States Patent Office 2,954,910
Patented Oct. 4, 1960

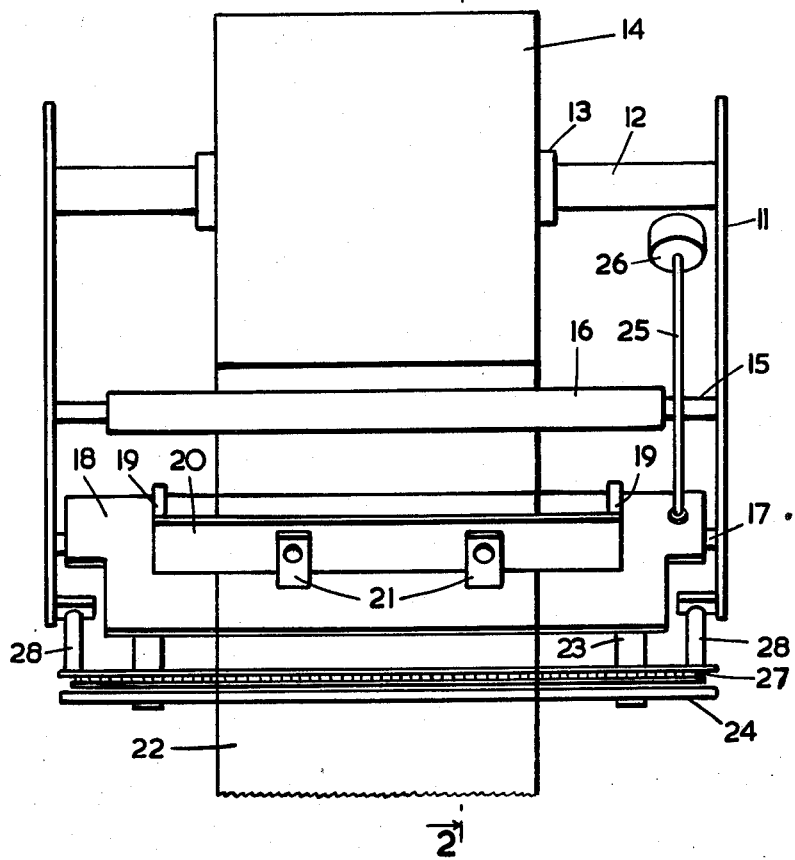
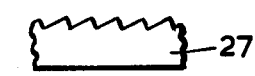
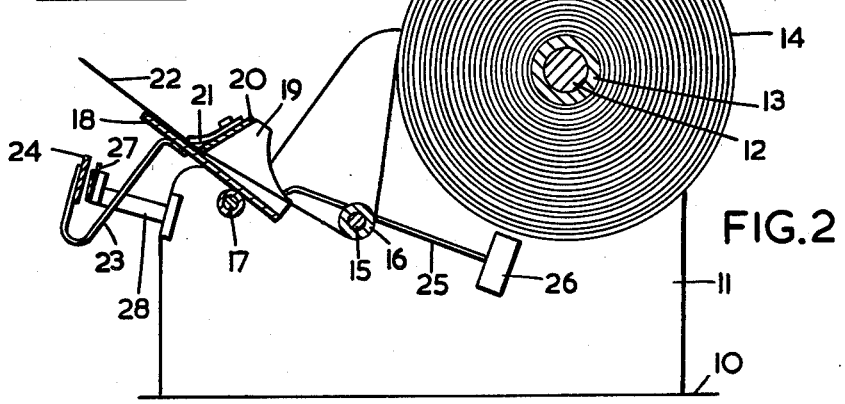

---

2,954,910

FILM-DISPENSING APPARATUS

Leslie John Moncrieff, London, England, assignor to British Celanese Limited, a corporation of Great Britain Filed Mar. 29, 1957, Ser. No. 649,411

Claims priority, application Great Britain Apr. 16, 1956

4 Claims. (Cl. 225—20)

This invention relates to film-dispensing apparatus and especially to a device for rapidly supplying separate lengths of packaging film from a spool thereof.

Certain methods of packaging involve applying by hand to the article to be packed a length of packaging film and manually or automatically causing this to be wrapped about the article and sealed. To operate such methods at speed requires a simple means of obtaining from a spool of packaging film the successive lengths to be used for each package. The present invention provides a device suitable for this purpose.

The dispensing device of the invention comprises: means for mounting the spool to rotate about a horizontal axis, a saw-toothed blade fixed in front of said means and parallel to said axis, a frame mounted to swing about a horizontal axis between the blade and the spool-axis, said frame carrying near its forward end a guard for the blade, and carrying behind said guard guide means for guiding the film from the spool past the blade, and means for yieldably urging the frame into a position such that the said guard shields the blade, the arrangement being such that with the film threaded between the frame and the guide means and the guard in its operative position, tension on the film swings the frame into a position in which the blade is exposed so that the film can be cut across by giving it a slight movement on to and across the teeth of the blade.

Preferably, the saw-teeth project upwards, the frame projects under the blade and carries at its forward end the guard in the form of a strip which, in the operative position, is immediately in front of and projects above the blade and which moves downwards to expose the blade as the film is drawn from the roll, the guide means comprise a guide roll behind the frame-pivot and a forward guide surface in front of said pivot, the path of the film when the guard is in the operative position being downwards from the spool, under the guide roll and thence upwards into contact with and over the said guide surface and from there in an upward direction above and past the blade. The forward guide surface may be the surface of a plate in contact with which the film is held by a strip of resilient material pressing downwards upon it. The yieldable means for urging the frame into the position in which the blade is shielded may comprise a counterweight.

Preferably in advance of the saw blade there is provided a pointer pointing in a direction transverse to that of the film length and adjustable as to its distance in advance of the blade, this point assisting in measuring the length of film to be cut off. In the operation of this device the film is drawn from the spool around the guide roller over and in contact with the guide surface, and above the blade until its free end is level with the pointer. It is then given a slight downward and sideways movement with the hand, causing it to contact and move slightly sideways over the saw teeth. By such a movement, which can be very rapidly performed, the film can be slit cleanly perpendicular to its length, so providing a piece of film of length equal to the distance between the saw blade and the pointer.

One form of apparatus according to the invention will now be described, with reference to the accompanying drawing wherein:

Figure 1 is a plan of the device;

Figure 2 is a sectional elevation through the line 2—2 of Figure 1; and

Figure 3 is a detailed view of the part of the saw blade showing the shape of its teeth.

Referring now to the drawings: On a base the upper surface of which is represented by the line 10 is mounted a pair of side plates 11 in which are journalled the axle 12 of the spool carrier 13 bearing a spool 14, the axle 15 of the guide roll 16, and the axle 17 of the guide plate 18. The guide plate 18 carries on its upper surface (the guide surface) a pair of side plates 19 connected by a bridge piece 20 to which are fastened two rubber guide members 21.

The film 22 is led from the upper surface of the spool, under the partly round guide roll 16 and between the guide members 21 and the upper surface of the guide member 18.

To the lower surface of the guide member 18 are fastened two hook shaped brackets 23 which extend downwards and support the two ends of a guard 24 in the form of a metal strip. In this embodiment the guide plate 18, axle 17 and brackets 23 constitute the hereinbefore referred to "frame mounted to swing about a horizontal axis between the blade and the spool axis." Attached to and projecting backwards from the pivotally mounted guide member 18 is a lever 25 carrying a weight 26 which urges the guide member 18 into its upper position. When the guide member 18 is in said position the guard 24 is in the operative position in front of the saw blade 27 which is carried on projections 28 attached to the side plates 11. The blade has teeth as shown in Figure 3. It is attached in such a way as to be readily removable for sharpening or replacement. On a guide member at one side of the machine and parallel with the side plates 11 is slideably mounted a pointer projecting inwards parallel with the axis of rotation of the spool (the guide member and pointer are not shown).

The operation of the device is as follows:

Starting with the apparatus in the position shown in Figure 2 the film 22 is drawn downwards and outwards until its free end is level with the pointer. In this position it is drawn further down and slightly sideways into contact with the teeth of the saw which have been exposed by the guide member 18 carrying the guard 24 moving into its downward position. This movement of the film slits it perpendicularly to its length and provides a length equal to that between the saw blade and the pointer. The weight 26 then causes the guide member 18 to move back into its upper position in which the blade 27 is protected by the guard 24 and further upward movement of the guide member 18 is stopped by the weighted lever 25 coming into contact with the axle 15.

Although the best results have been obtained when the teeth of the saw blade are of the form shown in the drawing other forms of saw tooth, e.g. teeth in the form of isosceles triangles could be employed. The action of the teeth is to pierce the film at a number of points in line. As the film is drawn downwards onto the teeth each perforation develops into a split and further movement causes adjacent slits to run together. This method of slitting the film is an important feature of the invention.

It will be observed that the pivotally mounted guide member 18 carrying the guard for the blade and urged into its upper position by a weighted lever serves a dual purpose. Besides guiding the film from the guide roll to the required position over the saw blade, it serves, under the tension applied by the film, to move the guard out of the way when the film is to be slit (at which stage the operator's hand cannot be in a position to be injured thereby) and when that tension ceases, owing to the rupture of the film, brings the guard back to the operative position. At the expense of some complication alternatives could be provided for this arrangement. Spring means, for instance, could replace the weighted lever and the pivotally mounted guide member might be replaced by a suitably designed guide member mounted to reciprocate instead of pivoting (e.g. a guide roller mounted on a slightly spring loaded support carrying the guard).

It is of advantage, especially when heavy spools of film are to be dealt with, for the spool to be mounted on ball bearings and, to prevent it over-running, for a brake to be provided on the spindle or on a drum fast thereon. The brake needs to be on during the actual cutting operation and off while the film is being drawn from the spool. It can easily be provided for the brake to be applied and taken off appropriately as a result of the movement of the counterbalance weight arm 25 or of the frame carrying the guard for the blade.

The device of the invention is particularly suitable for supplying lengths of packaging film of thickness from 0.5 to 5 mils and having a basis of plasticised cellulose acetate or other cellulose ester of a paraffinic monocarboxylic acid, e.g. cellulose propionate, butyrate, acetate-propionate and acetate butyrate.

Having described my invention, what I desire to secure by Letters Patent is:

1. A device suitable for dispensing separate lengths of packaging film from a spool in a direction hereinafter designated as "forward" and "in front of" said spool, said device comprising: means for mounting the spool to rotate about a horizontal axis, a saw-toothed blade fixed in front of the spool axis and parallel to the spool axis, a frame mounted to swing about a horizontal axis between the blade and the spool-axis, said frame carrying near its forward end and rigidly attached thereto a guard for and in front of the balde, and carrying behind said guard guide means for guiding the film from the spool past the blade, and means for yieldably urging the frame into a position such that the said guard shields the blade, the arrangement being such that with the film threaded between the frame and the guide means and the guard in its operative position, tension on the film swings the frame into a position in which the blade is exposed so that the film can be cut across by giving it a slight movement on to and across the teeth of the blade.

2. A device suitable for dispensing separate lengths of packaging film from a spool in a direction hereinafter designated "forward" and "in front of" said spool, said device comprising means for mounting the spool to rotate about a horizontal axis, a saw tooth blade fixed teeth upward in front of the spool axis, a frame mounted to swing about a horizontal axis between the blade and the spool axis, said frame projecting under the blade and carrying at its forward end a blade guard in the form of a strip which, in the operative position, is immediately in front of and projects above the blade and which is adapted on downward movement to expose the blade, and said frame carrying behind said blade guard a forward guide surface extending in front of the frame axis but terminating short of the blade, means for yieldably urging the frame into a position such that the said guard shields the blade, and a film guide roll rotatable about a fixed axis behind the frame axis, the path of the film when the guard is in the operative position being downwards from the spool, under the guide roll and thence upwards into contact with and over the said guide surface and from there in an upward direction above and past the blade.

3. A device according to claim 2, in which said forward guide surface is the surface of a plate in contact with which the film is held by a strip of resilient material pressing downwards upon it.

4. A device according to claim 3, wherein the yieldable means urging the frame into a position in which the blade is shielded by the guard is provided by a counterweight.

References Cited in the file of this patent

UNITED STATES PATENTS

| | | |
|---|---|---|
| 886,092 | Tily et al. | Apr. 28, 1908 |
| 2,125,736 | Murray | Aug. 2, 1938 |
| 2,247,750 | Dohnal | July 1, 1941 |
| 2,352,445 | Pinckney | June 27, 1944 |
| 2,663,369 | Erhardt | Dec. 22, 1953 |
| 2,670,041 | Krueger | Feb. 23, 1954 |